April 8, 1941.  L. BRISSON  2,237,650
BRAKE
Filed May 1, 1939     9 Sheets-Sheet 1

INVENTOR:
LOUIS BRISSON
BY: Haseltine, Lake & Co.
ATTORNEYS

INVENTOR
LOUIS BRISSON
BY Haseltine, Lake & Co
ATTORNEYS

April 8, 1941.  L. BRISSON  2,237,650
BRAKE
Filed May 1, 1939  9 Sheets-Sheet 3

INVENTOR:
LOUIS BRISSON
BY: Haseltine, Lake & Co.
ATTORNEYS

April 8, 1941.     L. BRISSON     2,237,650
BRAKE
Filed May 1, 1939     9 Sheets-Sheet 4

INVENTOR:
LOUIS BRISSON
BY Haseltine, Lake & Co.
ATTORNEYS

April 8, 1941.    L. BRISSON    2,237,650
BRAKE
Filed May 1, 1939    9 Sheets-Sheet 5

INVENTOR:
LOUIS BRISSON
BY: Haseltine, Lake & Co
ATTORNEYS

FIG. 20.

April 8, 1941.  L. BRISSON  2,237,650
BRAKE
Filed May 1, 1939  9 Sheets-Sheet 9

FIG. 24.

INVENTOR:
LOUIS BRISSON
BY: Haseltine, Lake & Co.
ATTORNEYS

Patented Apr. 8, 1941

2,237,650

UNITED STATES PATENT OFFICE 2,237,650

BRAKE

Louis Brisson, Paris, France

Application May 1, 1939, Serial No. 270,974
In France August 12, 1938

13 Claims. (Cl. 188—78)

The present invention is adapted to center in neutral position, the shoes of brakes, mainly of brakes having self-applying shoes, in which the forces and reactions exerted during braking on some or on each of the shoes have a given fixed direction and converge, for each shoe, towards a point called "pole" of said shoe.

In brakes of this kind, the reaction exerted by the drum on each shoe passes, of course, through the pole towards which converge all the forces and reactions to which the shoe is subjected, and it is tangent to a circle having for centre the centre of the drum and the radius $\rho$ of which is given by the formula: $\rho = s_1 \sin \varphi_1$ in which $\varphi_1$ is the friction angle and $s_1$ the radius of the pressure circle, which is itself given by the formula:

$$\frac{s_1}{r} = \frac{4 \sin \gamma_1}{\sin 2\gamma_1 + \gamma_1} \qquad (2)$$

In this Forumla 2, $r$ designates the radius of the drum, and $2\gamma_1$ the angular opening of the lining carried by the shoe under consideration.

The intersection of the pressure circle and of the reaction exerted by the drum on the shoe gives the centre of pressure; the radius passing through the centre of pressure is the pressure axis, relatively to which the lining is symmetrically arranged. All these arrangments are well known.

On the other hand, various means have already been proposed for restoring and holding the shoes, apart from the braking periods, in a definite neutral position. The invention has for object a new device of this kind, which is adapted to provide that, in the above mentioned neutral position, the free space comprised between the lining and the drum has, as symmetry axis, the symmetry axis of the lining.

This result is theoretically obtained by spacing the shoe from the drum by a movement of translation parallel to the symmetry axis of the lining, which coincides with the pressure axis, as already indicated. However, it is not practically possible to effect the spacing of the shoes by a movement of translation, as, in this type of brake, the shoes are necessarily connected together, or to a fixed point, by connecting rods transmitting the stresses which impose curved paths to the movement of the shoes. The technical problem according to the invention therefore consists, in fact, in bringing the shoes by rotation, to a neutral position which corresponds, relatively to the drum, to that which might be obtained by a movement of translation.

The solution of this technical problem is based on the following remark: the shoe being spaced from the drum by a movement of translation parallel to the symmetry axis of the lining, and being thus brought to a position in which said symmetry axis of the lining is also the symmetry axis of the free space comprised between the lining and the drum, nothing will be changed, concerning the relative position of the shoe and of the drum, by a movement of rotation effected about the axis of the drum. Now, the composition of a translation and of a rotation is a rotation of angular amplitude equal to that of the component rotation, but about a different centre. Consequently, for bringing the shoe by rotation to the ideal neutral position above defined, it is necessary, according to the invention, to determine the centre of a resultant rotation, consistent with the connections of the shoe, and to guide said shoe so that it rotatively moves about said centre.

The accompanying drawings, illustrate, by way of example only, some forms of carrying the invention into practice.

Figure 1:
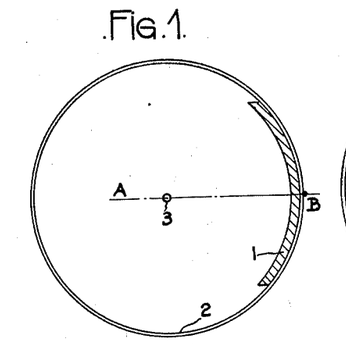
Fig. 1 is a diagram of a brake composed of a drum and a shoe, the shoe being in braking position.

Fig. 1 shows a brake shoe 1 in contact with the drum 2, the centre of which is at 3; none of the connections which allow of applying the shoe 1 against the inner surface of the drum 2, and which absorb the reactions exerted by the braking on said shoe, have, intentionally, been illustrated. In fact, it is a question, for the moment, of explaining by what means the invention ensures the centering of the shoe in neutral position.

Figure 2:
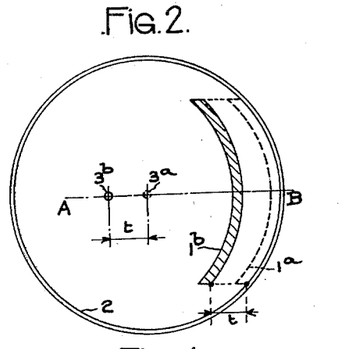
Fig. 2 is a diagram of the same brake, the shoe having been subjected to a radial movement of translation towards the centre of the drum.

In Fig. 2, the shoe is illustrated at $1^a$ in the same position as in Fig. 1, whereas at $1^b$ the shoe is shown as being disengaged from the drum by a movement of translation $t$ effected parallel to the symmetry axis A—B of said shoe. It is then obvious that said symmetry axis A—B of the shoe is also the symmetry axis of the space comprised between the shoe in its position $1^b$ and the drum 2.

It will be noted that the centre of the outer cylindrical surface of the shoe, which coincided at $3^a$ with the center of the drum when the shoe was in the position $1^a$, is located at $3^b$, at a distance $t$ from $3^a$, when the shoe has come to $1^b$.

Figure 3:
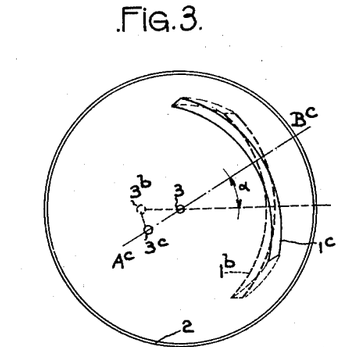
Fig. 3 is a diagram of the same brake, the shoe having been subjected, in addition to a radial movement of translation towards the centre of the drum, to a movement of rotation about the centre of the drum.

Fig. 3 shows at $1^b$ the shoe in the same position as that of Fig. 2, whereas at $1^c$ the shoe is illustrated after a movement of rotation through an angle $\alpha$ about the centre 3 of the drum 2. The symmetry axis of the shoe has thus come to $A^c$—$B^c$, but it can be seen that the position $1^c$ of the shoe, relatively to the drum 2 which is cylindrical, is exactly the same as the position $1^b$. Consequently, the axis $A^c$—$B^c$ is also the symmetry axis of the space comprised between the shoe in the position $1^c$ and the drum 2.

Now, it is well known that the composition of a translation $t$ and of a rotation $\alpha$ is another rotation, of an amplitude equal to $\alpha$, but taking place about another centre.

Figure 4:
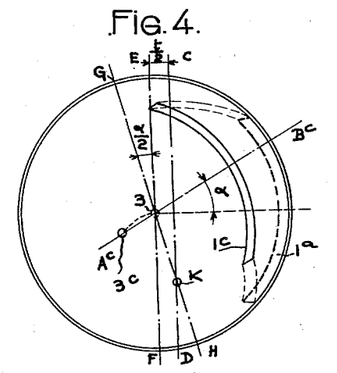
Fig. 4 is a diagram of the same brake, in the same position as Fig. 3, but showing a means for determining the centre of the resultant rotation.

The classical construction of this centre is shown in Fig. 4. In the known manner, the translation $t$ is replaced by two symmetries having axes perpendicular to the direction of the translation, the axis of the second symmetry passing through the centre 3 of the component rotation; in these conditions, the first symmetry has for axis C—D and the second has for axis E—F, both these axes being at the distance $$\frac{t}{2}$$

Then, the rotation $\alpha$ is replaced, in the known manner, by two symmetries, one having an axis E—F, the other an axis G—H, inclined according to the angle $$\frac{\alpha}{2}$$

relatively to E—F, and which encounters C—D at K. The point K is the centre of the resultant rotation.

Figure 5:
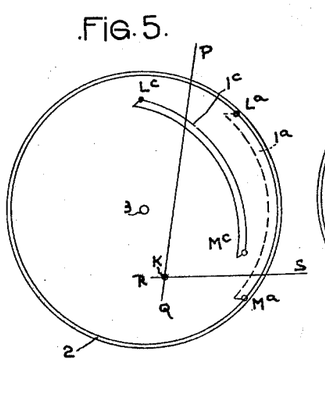
Fig. 5 is a diagram similar to that of Fig. 4, but showing another means for determining the centre of the resultant rotation.

Fig. 5 shows another form of construction, utilisable when the tracing of the positions $1^a$ and $1^c$ has been effected.

Any point L has the two positions $L^a$ and $L^c$; any other point M has the two positions $M^a$ and $M^c$. It then suffices to draw the lines PQ perpendicular to the straight line $L^a$—$L^c$ and RS perpendicular to the straight line $M^a$—$M^c$ for obtaining the point K at their intersection.

The invention consists, in the first place, in guiding the shoe 1 so that the movement which brings it from its working position to its neutral position is a rotation about the point K, this guiding taking place by means which, during braking, do not exert appreciable interfering reactions on the shoe. In fact, it will be remembered that the stresses and reactions to which said shoe is subjected must have definite directions, so that the shoe cannot possibly be pivoted directly on a fixed axis, as then, neither the intensity, nor the direction of the reaction due to said axis would be definite; the invention solves the problem by limiting the intensity of the reaction, through the medium, for instance, of one or the other of the following means:

1. When the centre of the resulting reaction is accessible, it serves as free pivotal axis for the end of a friction connection of variable length, and for instance for the free end of a branch of a compass, the other branch of which is frictionally pivoted on the shoe, the pivotal joint of both branches of the compass being also a frictional joint. This connection is in all points similar to directly pivoting the shoe on its centre of resultant rotation, as long as the stresses which are exerted on said shoe remain sufficiently small so as not to overcome the friction, for instance, the friction of the pivotal joints; the centering in neutral position is therefore perfectly ensured. But as soon as the stresses exerted on the shoe become great, which takes place during braking, the frictions become negligible, relatively to said stresses, and consequently, the centering connection introduces no perturbation in the braking.

2. Use can also be made of two friction connections, and for instance two compasses having frictionally pivoted branches, for connecting two different points of the shoe to the axis of the resultant rotation, and in this case, either the pivotal joints of the branches on the shoe, or the pivotal joints of the branches themselves, need not be frictional joints.

3. When the axis of resultant rotation is not accessible, use can also be made of these two friction connections, such as compasses, but then the second branch of each of them which can no longer be pivoted on the axis of the resultant rotation, is pivoted on a fixed axis arranged on the straight line which joins the axis of resultant rotation to the second free pivotal joint of the compass, which is, according to the type adopted, either the pivotal axis of the first branch on the shoe, or the pivotal axis of both branches on each other.

4. When the shoe is already connected by a link to a fixed point, if the axis of resultant rotation does not coincide with this point, it is necessarily located on the extension of the link, and it then suffices to use only one of the compasses mentioned in the above paragraphs 2 or 3.

When the brake shoes are entirely floating and thus operate in a symmetrical manner when running forward or when reversing, it is obvious that, for each shoe, the axes of resultant rotation are not the same in both directions of running. It is consequently evident that the centering, correctly obtained when running forward according to the principles previously set forth, is not correct in the case of reversing; it would be reestablished as soon as the first braking when running forward is effected, but the invention however provides a means for avoiding this momentary inconvenience. This means is characterised by the combination of the two following arrangements:

(a) The pivotal axes of the ends of the branches of the compasses are arranged, when it is possible to do so, on the straight line passing through both centres of the resultant rotation of the shoe under consideration, for forward running and for reversing;

(b) When it is impossible to do so, the axes which ought to be secured on the cheek member are each mounted on a movable support (for instance, a pivoting support) which is locked when braking takes place when running forward, and which is released when braking during reversing, so that during said braking when reversing, the compasses are practically subjected to no stress tending to open or to close them.

Although the invention mainly relates to brakes provided with self-applying shoes, in which the stresses and reactions exerted during braking on some or on each of the shoes have a definite fixed direction and converge, for each shoe, towards a point called "pole" of said shoe, without departing from the invention, the means forming the subject-matter of the same can be applied to brakes to which the preceding definition does not apply.

For instance self-applying brakes having two floating shoes exist in which the opening force of the shoes and the abutting reaction of said shoes are not directed in a rigorously fixed manner; the invention nevertheless applies to these brakes and in this case comprises certain simplifications. Thus, it suffices to ensure the centering of a single shoe, and in addition, it suffices, for said shoe, to guide a single one of its points.

The invention can even be applied to brakes which are not self-applying brakes; in this case, the friction connections of variable length previously described will be replaced by connections of fixed length.

Figure 6:
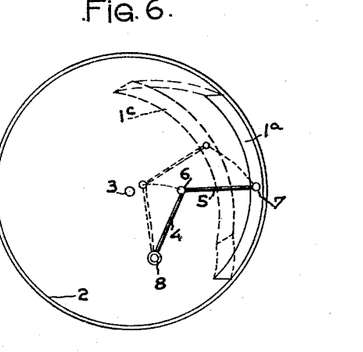
Fig. 6 is a diagram of a first means for guiding the shoe.

In the example of Fig. 6, use has been made of a compass the branches 4 and 5 of which are frictionally pivoted at 6. The free end of branch 5 is frictionally pivoted at 7 on the shoe 1, whereas the free end of branch 4 is freely pivoted on the fixed axis 8 which is located at the exact place of the point K, centre of the resultant rotation of the shoe. The friction pivotal joints are illustrated by a single small circle, the free pivotal joints by two concentric circles.

In these conditions, when the stresses exerted on the shoe are not very great (which is the case when the shoe leaves its working position to assume its neutral position) the connection 4—5—6—7 acts as a rigid unit with the shoe 1, and this unit rotates without distortion about the axis 8, for moving from the working position 1ª to the neutral position 1ᶜ, which is then the correct position. On the contrary, during braking when the stresses are great, it is obvious that the frictions at 6 and 7 are easily overcome by said stresses without introducing any prejudicial reaction.

It is to be mentioned here that the compass 4—5—6 might be replaced by any other device, freely pivoted at 8 and frictionally pivoted at 7, the length of which can vary under the action of stresses sufficiently great for overcoming an internal resistance, such as a friction.

Figure 7:
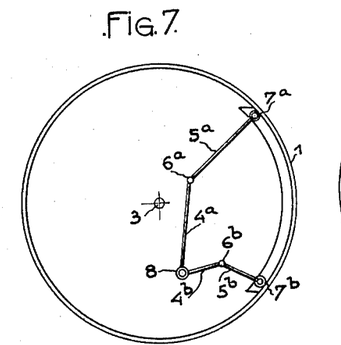
Fig. 7 is a diagram of a second means for guiding the shoe.

In the example of Fig. 7, use has been made of two compasses 4ª—5ª—6ª and 4ᵇ—5ᵇ—6ᵇ identical to the preceding one and respectively connecting the points 7ª and 7ᵇ to the axis 8; but then the pivotal joints 7ª and 7ᵇ need not be friction joints; therefore, free pivotal joints have been illustrated here at 7ª and 7ᵇ.

In fact, the points 7ª—7ᵇ and 8 form the apices of a triangle and this triangle is only distortable under the action of stresses sufficient for overcoming the frictions at 6ª and 6ᵇ, which determine the length of the sides 7ª—8 and 7ᵇ—8.

Figure 8:
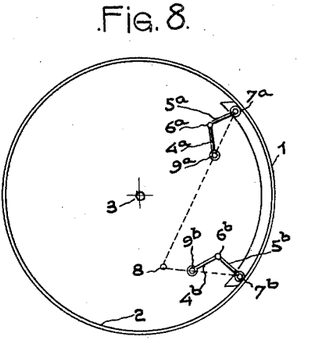
Fig. 8 is a diagram of a third means for guiding the shoe.

If the centre 8 is not accessible, or for any other reason, according to the invention, the free ends of the branches 4ª and 4ᵇ can be pivoted, not on the point 8, but on any points 9ª and 9ᵇ taken on the straight lines which respectively join the points 7ª and 7ᵇ to the centre 8. This is what is illustrated in Fig. 8. In fact, it will be seen that the quadrilateral having for apices the points 7ª—9ª—7ᵇ—9ᵇ comprises a fixed side 9ª—9ᵇ and a movable opposite side 7ª—7ᵇ which is no other than the shoe 1. Therefore, it is known that the instantaneous centre of rotation of the movable side 7ª—7ᵇ (shoe 1) is the point of intersection of the sides 7ª—9ª and 7ᵇ—9ᵇ which, by construction, is point 8. It is true that this instantaneous centre of rotation moves at every instant during the rotation of the shoe; but the amplitude α of said rotation is sufficiently small for said movement to be considered as negligible in practice, and for everything to take place as if the shoe 1 really rotated about the virtual axis 8 when it passes from its neutral position to its working position and vice versa.

Figure 9:
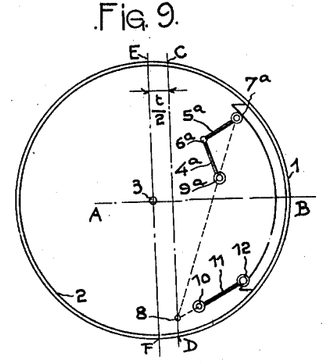
Fig. 9 is a diagram of a fourth means for guiding the shoe.

This remark is of very great interest, because it allows of rendering the centering connection according to the invention, consistent with the connections necessitated by the operation of the shoe during braking. In Fig. 9, for instance, the shoe 1 is connected to a fixed point 10 by a link 11 pivoted at 10 and at 12.

It is then necessary to use said link as one of the sides of the pivoted quadrilateral described with reference to Fig. 8, and, for that purpose, the centre of resultant rotation must be chosen on the extension of said link, which is always possible. In fact, the desired component translation is given by hypothesis (Fig. 2) and it is then known (Fig. 4) that the locus of the centre of resultant rotation K is a straight line CD, at right angles to the symmetry axis AB of the shoe in working position. Consequently, the axis K can be chosen at any desired place on said straight line CD; alone the angle of the component rotation, which angle is of no importance (Fig. 3), will vary. Consequently, in the case of Fig. 9, the point K (virtual axis 8) will be located at the intersection of the axis CD and the extension of the link 11; then the compass 4ª—5ª—6ª will be mounted between the points 7ᵃ and 9ᵃ such that the straight line 7ᵃ—9ᵃ passes through the point 8. Everything will then take place as explained with reference to Fig. 8, as if the shoe 1 rotated about the virtual axis 8 when passing from its working position to its neutral position and vice versa. Furthermore, for still improving the result obtained, instead of choosing the point 8 at the intersection of the axis CD and the extension of the link 11 in working position, it can be chosen at the intersection of C—D and the extension of the link 11 in mean position, mid-way between the neutral position and the working position.

Figure 10:
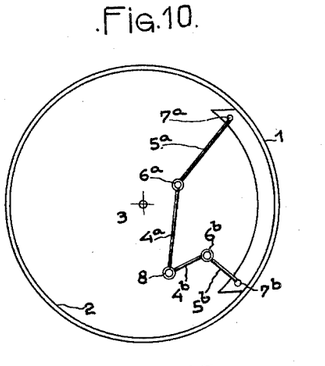
Fig. 10 is a diagram of a fifth means for guiding the shoe.

In the device of Fig. 7, as shown in Fig. 10, the pivotal joints 6ᵃ and 6ᵇ might also be rendered free and on the contrary the pivotal joints 7ᵃ and 7ᵇ might be frictionally mounted. Nothing would then be changed in the operation, as the quadrilateral 7ᵃ—7ᵇ—6ᵇ—6ᵃ would be rendered undistortable (except under the action of important stresses); consequently, the side 6ᵃ—6ᵇ of the triangle 8—6ᵃ—6ᵇ would also be undistortable, and the whole would therefore rotate as a block about the axis 8.

Figure 11:
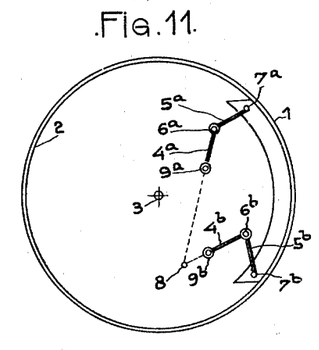
Fig. 11 is a diagram of a sixth means for guiding the shoe.
Figure 12:
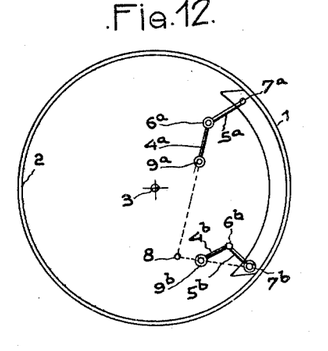
Fig. 12 is a diagram of a seventh means for guiding the shoe.
Figure 13:
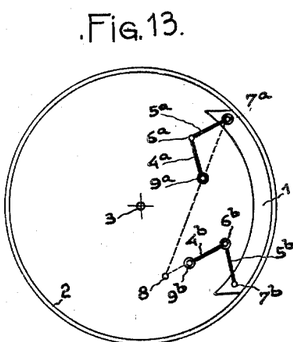
Fig. 13 is a diagram of an eighth means for guiding the shoe.

In the device of Fig. 8, in the same manner, the pivotal joints 6ᵃ and 6ᵇ (or only one of them) might also be rendered free, and on the contrary the pivotal joints 7ᵃ and 7ᵇ (or only one of them, 7ᵃ or 7ᵇ, if only one pivotal joint 6ᵃ or 6ᵇ, respectively, is rendered free), might be frictionally mounted. Fig. 11 shows the case in which both pivotal joints 6ᵃ—6ᵇ are rendered free and both pivotal joints 7ᵃ—7ᵇ frictionally mounted, whereas Fig. 12 shows the case in which the pivotal joint 6ᵃ only is rendered free, the pivotal joint 7ᵃ being frictionally mounted, and Fig. 13 shows the case in which the pivotal joint 6ᵇ only is rendered free, the pivotal joint 7ᵇ being frictionally mounted.

In Fig. 11, owing to the friction at 7ᵃ and 7ᵇ, the points 6ᵃ and 6ᵇ can be considered as belonging to the shoe 1, it is therefore necessary that the extended straight lines 4ᵃ and 4ᵇ converge towards point 8. In Fig. 12, the straight line 4ᵃ passes through the point 8, whereas in Fig. 13 it is the straight line 4ᵇ.

Figure 14:
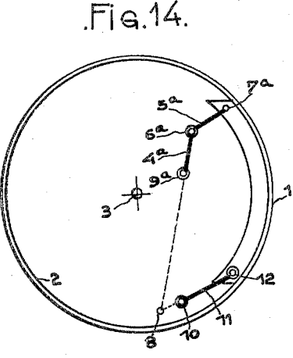
Fig. 14 is a diagram of a ninth means for guiding the shoe.

In the device of Fig. 9, as shown in Fig. 14, the compass can also be replaced by another having the pivotal joint 6ᵃ free and the pivotal joint 7ᵃ frictionally mounted, the extension of branch 4ᵃ passing through point 8.

Figure 15:
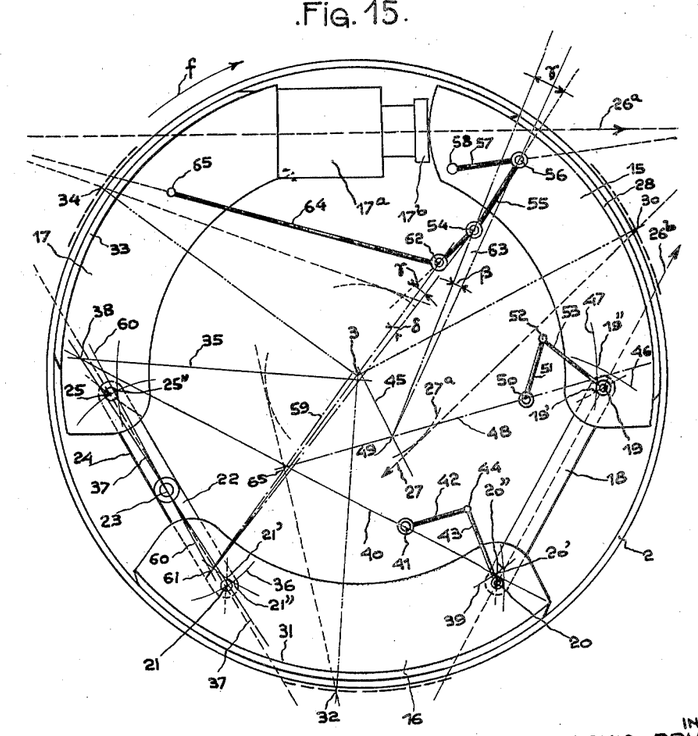
Fig. 15 shows a first form of construction of a brake according to the invention.

The example of Fig. 15 relates to a brake similar to that described in the U. S. A. Patent No. 2,131,369 dated September 27, 1938, concerning the braking system proper, but obviously different as regards the method of centering.

The brake illustrated is constituted by the brake drum 2 and by three shoes 15, 16 and 17. The shoes 15 and 16 are connected by a link 18 pivoted at 19 on the shoe 15 and at 20 on the shoe 16. The latter is pivoted at 21 on another link 22 itself pivoted on a fixed axis 23.

Another link 24 is also pivoted on said fixed axis 23, and pivots at 25 on the shoe 17, which carries at 17ᵃ the body of the device for spacing the shoes, which is here, for instance, a hydraulic device, and the piston 17ᵇ of which presses against the end of the shoe 15 through a plane face.

The direction of rotation for forward running is indicated by the arrow f.

It is known that, in brakes of this type, the forces and reactions exerted on each shoe are set and converge towards a point called "pole" of the shoe. For the shoe 15, the opening stress is directed according to the arrow 26ᵃ and the reaction due to the link according to the arrows 26ᵇ, so that the reaction due to braking passes through the pole which is at the point of convergence of 26ᵃ and 26ᵇ and is tangent to a circle 27ᵃ having a radius $\rho = s_1 \sin \phi_1$, $s_1$ being the radius of the pressure circle, and $\phi_1$ the friction coefficient. For calculating $s_1$ use is made of the formula:

$$\frac{s_1}{r} = \frac{4 \sin \gamma_1}{\sin 2\gamma_1 + 2\gamma_1}$$

in which $r$ is the radius of the drum, and ($2\gamma_1$) the angular opening of the friction lining 28 carried by the shoe 15.

This braking reaction can then be traced according to the line 27, which encounters at 30 the pressure circle having a radius $s_1$. The line which joins the centre 3 of the drum to the centre 30 is the pressure axis, and the lining 28 is symmetrically arranged relatively to said axis, which acts, for the shoe 15, as the symmetry axis AB of Fig. 2.

For the shoe 16, in the same manner the pressure axis (and symmetry axis of the lining 31) is found, passing through the centre of pressure 32; and for shoe 17, the pressure axis (and symmetry axis of the lining 33) passing through the centre of pressure 34.

All these arrangements are known.

But, according to the invention, each of the shoes is guided in the manner previously described, during its movement from the working position to neutral position. For instance, for the shoe 16, the translation $t_1$ which was considered in Fig. 2 is fixed beforehand; on the axis of pressure 3—32 is traced the length $$\frac{t_1}{2}$$

in accordance with what has been explained for Figs. 4 and 9, and the straight line 35 is drawn at right angles to the axis 3—32. Then the stroke of the axis 21 is determined, which is very easy; in fact, it is known that this axis moves on a circle 36 having a fixed centre 23 and a fixed radius 22, which gives a first locus of the axis 21 in neutral position. On the other hand, the distance 3—21' can easily be determined after the shoe 16 has effected the translation $t_1$, so that with an opening of the compass equal to this distance which has just been found, and with 3 as centre, the position 21'' of 21 is easily determined, when the shoe is in neutral position, on the circle 36. The perpendicular 37 is dropped at the middle of 21—21'', according to what has been explained concerning Fig. 5, and at the intersection 38 with the straight line 35 is found the centre of resultant rotation of shoe 16.

The position 20'' of the axis 20 is now determined in neutral position, for that purpose, the distance 3—20' is determined (20' being the position of 20 after the translation $t_1$) which gives a first locus formed by the circle 39 having a radius 3—20' and a centre 3. A second locus is formed by the circle having a center 21'' and a radius 20—21. Then the point 20'' is easily found and through the middle of 20—20'' the perpendicular 40 is traced which necessarily passes through the centre 38 and on which a fixed axis 41 is chosen for the compass 42—43, the branches of which are frictionally pivoted on each other at 44, whereas the branch the branch 42 is freely pivoted at 41 and the branch 43 is freely pivoted on the axis 20 of the shoe.

Thus, the shoe 16 is guided in the manner illustrated in Fig. 9.

For the shoe 15, the following method of procedure is adopted. The half-translation $$\frac{t_2}{2}$$

is traced on the pressure axis 3—30, and the line 45 is drawn at right angles to the pressure axis. Then the position 19'' of the axis 19 is determined when the shoe 15 is in neutral position. For that purpose, it will be noted that the distance 20''—19'' is equal to the length of the link 18, which gives a first locus formed by the circle 46 having a center 20'' and a radius equal to the link 18. A second locus is given by the circle 47 having a centre 3 and a radius equal to 3—19', 19' being the position of the axis 19 after the translation $t_2$ parallel to the pressure axis, which can be easily traced. The point 19'' being thus obtained, the line 48 is traced at right angles to 19—19'', which encounters at 49 the straight line 45. The point 49 is the centre of resultant rotation of the shoe 15.

On the straight line 48, a point 50 is chosen for freely pivoting thereon the end of the branch 51 of a compass, frictionally pivoted at 52 on the second branch 53, itself freely pivoted on the axis 19. Then an axis 54 is chosen beforehand, and the line 49—54 is traced on either side of which is drawn the angle $\beta$ having 49 for apex and the radius 3—49 (not shown) and the straight line 45 for sides. In accordance with what has been stated for Fig. 4, said angle is equal to a half-rotation of the shoe 15 about the axis of resultant rotation 49. Then an angle $\gamma$ is traced, chosen beforehand and greater than $\beta$, having 54 for apex and the straight line 49—54 for side, this giving the length of a first branch 55 of a compass, freely pivoted at 54; said branch 55 is also freely pivoted at 56 on the second branch 57, which is frictionally pivoted at 58 on the shoe 15. It is then seen that this shoe is guided in the manner described concerning Fig. 12.

For the shoe 17, a similar method of procedure is again adopted by tracing on the pressure axis, the half-translation $$\frac{t_3}{2}$$

then by drawing the line 59 at right angles to the pressure axis; the neutral position 25'' of the axis 25 is then traced, by the same processes as those employed for the axis 21, and the perpendicular 60 is dropped at the middle of 25—25'', which encounters the straight line 59 at the centre of pressure 61. 61 is joined to 54, and on either side of said straight line is drawn the angle $\delta$ having 61 for apex and the perpendicular 59 and straight line 3—61 for sides, said angle $\delta$ illustrating (as explained by Fig. 4) the half-rotation of the shoe 17. Then, at 54, and on either side of the straight line 61—54, the angle $\gamma$ previously defined is drawn (which must also be greater than $\delta$), this giving at 62 the position of the free pivotal joint of a compass one branch 63 of which is freely pivoted on 64, whereas the other 64 is frictionally pivoted at 65 on the shoe 17.

It is thus seen that said shoe 17 is guided in a manner similar to Fig. 14.

It will be noted that the rotations of the arms 63 and 55 are the same and equal to 2$\gamma$ by construction. These two arms might be therefore integral, but it would however be advantageous to use two separate arms, and frictionally couple them.

This arrangement is adapted to prevent any movement of the shoes in their neutral position. If, in fact, the arms 63 and 55 were not connected to each other, preferably by friction, each of the shoes 15 and 17 could rotatively move about its instantaneous centre; both arms 63 and 55 being, on the contrary, connected, it results therefrom that any movement of the shoe 17 relatively to the drum (that is to say, a movement towards or away from said drum) results in a similar relative displacement of shoe 15, and vice versa.

Now, the spring prevents their mutual spacing apart, and the device 17$^a$ prevents them moving towards each other, so that the shoes 15 and 17 are therefore held stationary, and the shoe 16, retained by the link 19, cannot move either.

Preferably, the branch 57 will be directed towards the pole of shoe 15, as illustrated, whereas the branch 64 will be directed towards the pole of shoe 17. A returning spring is stretched between the shoes 15 and 17, in the usual manner, but said spring can also act on the arms 63 and 55.

Instead of guiding the axes 20 and 19 as explained, the link 18 might be guided in the manner described by Fig. 6, by uniting it by a compass to its instantaneous axis of rotation which is located at 65, at the intersection of the straight lines 40 and 48.

Figure 16:
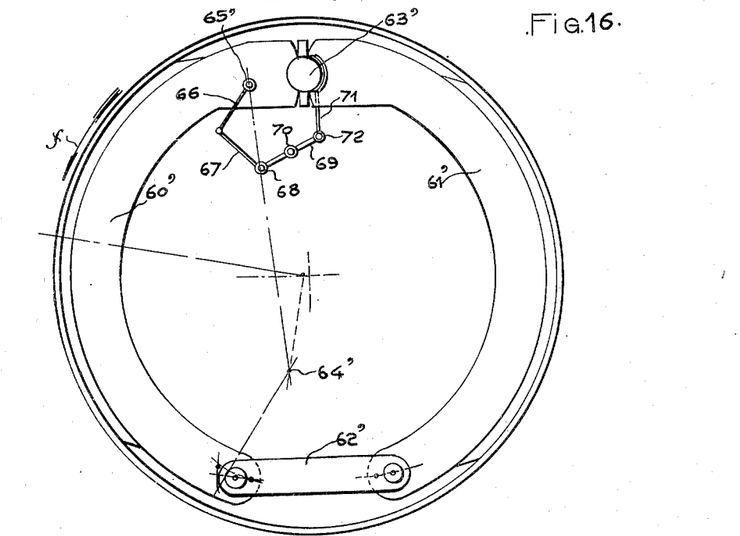
Fig. 16 shows a second form of construction of a brake according to the invention.

In the example of Fig. 16, the shoes 60' and 61' are connected by a link 62', and are entirely floating. But, in neutral position, they both take a bearing on a cylindrical part 63'. In these conditions, it is evident that it suffices to hold one only of the shoes, and for instance the shoe 60', stationary at the right place, in neutral position. For that purpose, its centre of resultant rotation 64' is determined in the manner previously described, by noting that the direction of rotation of the drum for forward running, is that of the arrow $f$. The centre of resultant rotation of the shoe 61', for forward running, is therefore at 63'. Any one of the points of the shoe, for instance 65', is then guided, through the medium of one of the means already described, such as a compass the branches 66 and 67 of which are frictionally pivoted together, the branch 66 being freely pivoted on 65', and the branch 67 freely pivoted on the fixed axis 68.

It will be noted that for reverse running, the position of the centre of resultant rotation 64 changes and comes at 63', since when reversing the shoe 60' bears on 63' and pivots on said axis. As explained, the correct centering for forward running would therefore not be correct for reverse running. For avoiding this inconvenience, the axis 68 can be rendered free when braking during reverse running. For that purpose, said axis is mounted on a lever 69 pivoted at 70, and provided with a lug 71, pivoted at 72, which presses, in neutral position, against the cylindrical part 63' and is held thereon by the shoe 61'. It will be seen that when braking is effected when running forward, the lug 71 cannot move as it is held stationary by the shoe 61' which presses against the part 63 through its intermediary. Therefore, the axis 68 is fixed. On the contrary, during reverse running, the lug 71 is released, and the axis 68 can move, so that during braking, the compass 66—67 is not subjected to any stress tending to open or to close it. At the end of the braking during reverse running, the shoes will therefore return to their correct initial position.

Figure 17:
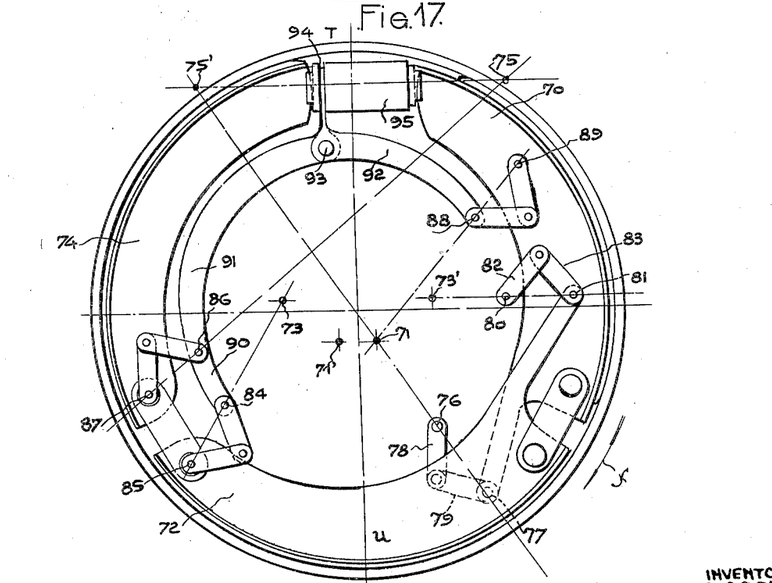
Fig. 17 shows a third form of construction of a brake according to the invention.

In the example of Fig. 17, a brake has been illustrated having three floating shoes, established according to the principles previously set forth, and which it is unnecessary to recall. When running forward, the centre of resultant rotation of the shoe 70 is at 71, that of shoe 72, is at 73, that of shoe 74 is at 75. But, during reverse running, the centre of resultant rotation of the shoe 70 is at 75' symmetrical to 75, relatively to the axis T—U, since the shoe 70 then acts as the shoe 74; the centre of resultant rotation of the shoe 74 is then at 71', and that of the shoe 72 at 73'.

In these conditions, the shoes are guided in accordance with what has been previously stated; but it will be seen that the axes 76 and 77 of the compass 78—79 relating to the shoe 70 are on the line 71—75', so that the axis 76 can be fixed. Likewise, the axes 80 and 81 of the compass 82—83 relating to the shoe 72 are on the line 73—73', so that the axis 80 can be fixed.

On the contrary, it has not been possible to arrange the axes 84—85, 86—87, 88—89 of the other compasses on the lines joining the respective centers of resultant rotation in both directions of running. The axes 84, 86 and 88 have therefore been each mounted on a lever 90, 91 and 92, these three levers being pivoted at 93 and held stationary by lugs such as 94 during braking when running forward, owing to the fact that the shoe 74 presses said lugs against the fixed casing 95 of the system for opening the shoes. On the contrary, during reverse running, the levers 90—91—92 are released.

The invention is applicable to brakes which are not self-applying brakes; in this case, the friction and variable length connections previously described would be replaced by fixed length connections. Brakes having multiple shoes would thus be obtained, in which the total pressure would be equally distributed on all the shoes, and, in each shoe, symmetrically distributed on either side of the symmetry axis of the lining.

Another means of guiding the shoe will now be described; this means consists in obtaining the resultant rotation (that which results from the composition of a translation parallel to the symmetry axis of the lining and a rotation about the axis of the drum) by the composition of at least two rotations.

The advantage of this means is particularly important in the case of self-applying brakes having two shoes the outlet shoe of which (the last which is encountered when leaving the spacing system and by moving in the direction of the rotation) presses, during braking, on a fixed axis; as this axis can then constitute the axis of a first rotation for the inlet shoe, which it then suffices to rotatively guide about a point, real or fictitious, belonging to the outlet shoe. It is moreover possible to cause the axis of the second component rotation to converge towards the symmetry axis of the shoes. In this case, the brake can be devised in a practically symmetrical manner and can operate in the same way both for forward running and for reverse.

For facilitating the explanation, the manner in which the composition of two rotations is effected will first be recalled.

A rotation according to an angle about a point O (Fig. 18) can, in an infinite number of ways, be considered as being the product of two symmetries the axes of which pass through the point O and form between them the angle $$\frac{\alpha}{2}$$

Figures 18, 19:
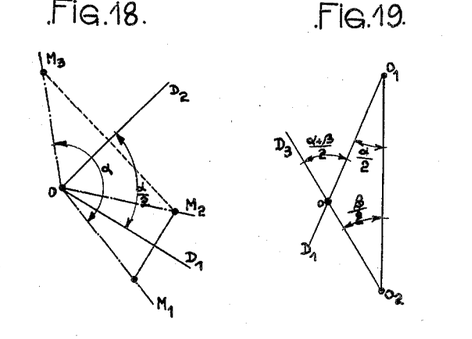
Fig. 18 is an explanatory diagram of the composition of two movements of rotation.
Fig. 19 is an explanatory diagram of the manner in which the product of two movements of rotation is obtained.

For instance, in Fig. 18, the point $M_2$ is symmetrical to the point $M_1$ relatively to the straight line $D_1$ passing through O; the point $M_3$ is symmetrical to the point $M_2$ relatively to the straight line $D_2$ passing through O. The straight lines $D_1$ and $D_2$ forming between them the angle $$\frac{\alpha}{2}$$

it is obvious that $M_1$ comes to $M_3$ by a rotation through an angle $\alpha$ about O. Reversely, a rotation through an angle $\alpha$ about O can be replaced by two symmetries, the axes $D_1$ and $D_2$ of which can be of any kind whatever, provided they pass through O and that they form between them the angle $$\frac{\alpha}{2}$$

For effecting the product of two rotations (Fig. 19) about two axes $O_1$ and $O_2$, as axis of the second component symmetry of the rotation about $O_1$ and as axis of the first component symmetry of the rotation about $O_2$, is chosen the straight line $O_1O_2$.

The straight line $D_1$ is traced, passing through $O_1$ and forming with the straight line $D_2$, passing through $O_1$ and $O_2$, an angle $$\frac{\alpha}{2}$$

equal to half the angle $\alpha$ of the rotation about $O_1$, said angle $$\frac{\alpha}{2}$$

being drawn in reverse direction to said rotation, since $D_2$ is the axis of the second component symmetry of the rotation about $O_1$. Then the straight line $D_3$ is traced passing through $O_2$ and forming with the straight line $D_2$ an angle $$\frac{\beta}{2}$$

equal to half the angle $\beta$ of the rotation about $O_2$, said angle $$\frac{\beta}{2}$$

being drawn in the same direction as said rotation, since $D_2$ is the axis of the first component symmetry of the rotation about $O_2$. The straight lines $D_1$ and $D_3$ meet at O, this point being the centre of the resultant rotation, the amplitude of which is equal or double the angle $D_1OD_3$, that is to say $(\alpha+\beta)$.

It will be immediately seen that, for constructing the triangle $O—O_1—O_2$, it suffices to know three of its elements, which are six in number, viz.: the position of each of its sides, and the size of each angle. As will be seen later on, the brake constructor will therefore be free to choose at will, three of his elements; but the remainder of the brake will be determined by this choice made beforehand.

Figure 20:
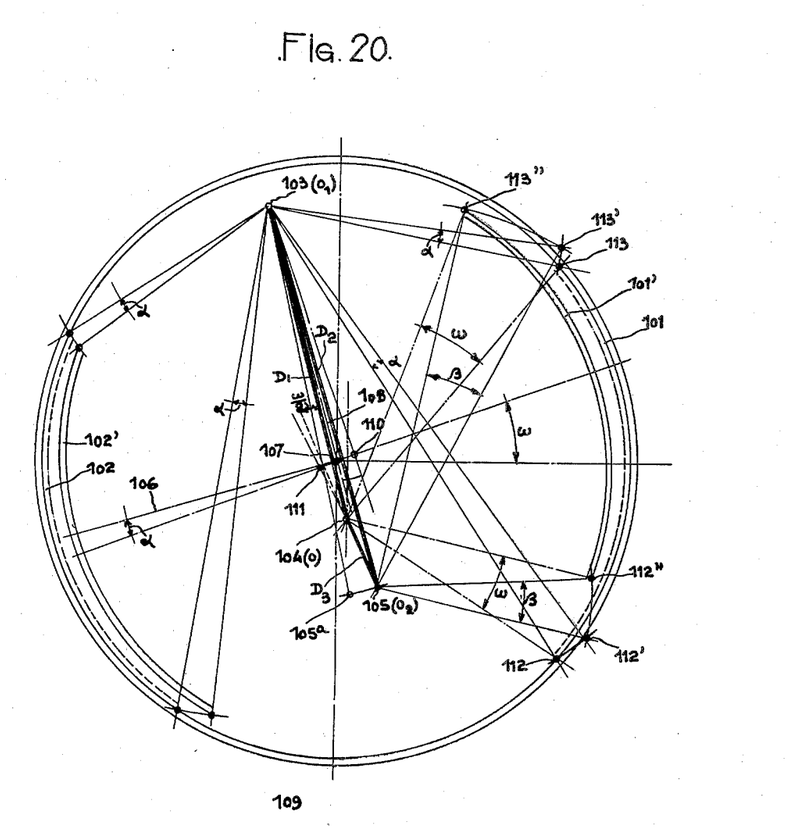
Fig. 20 is a diagram for determining the centres of the component rotations.

In the example of Fig. 20, is diagrammatically shown a brake having two shoes 101 and 102, one of which 102 is pivoted at 103 whereas the other 101 must be capable of being considered, during the movement from neutral position to braking position, and reversely, as being pivoted on the preceding one at a point which is to be determined, by assuming beforehand that the point 104 constitutes the virtual centre of rotation of the shoe 101, is known as well as the amplitude $\omega$ of said rotation.

The amplitude $\alpha$ of the rotation of the shoe 102 is also given, and thus three elements of the triangle O—O₁—O₂ of Fig. 2 are known. In fact, the axis 103 corresponds to the point O₁ of Fig. 2, the virtual axis 104 corresponds to the point O; and it will thus be seen that the size and position of the side OO₁ is known, and the angles at O₁ and at O. It is now very easy to determine the position of the axis 105, corresponding to the point O₂, by constructing the triangle.

For that purpose, the axes 103 and 104 are joined by a straight line; said straight line corresponds to the straight line D₁ of Fig. 2. At 103 an angle $$\frac{\alpha}{2}$$

is traced which allows of drawing the straight line D₂; finally at 104, an angle $$\frac{\omega}{2}$$

is traced which allows of drawing the straight line D₃. The straight lines D₂ and D₃ meet at the point 105 which is the point sought for.

The point 105 is the pivotal point of the shoe 101 on the shoe 102, and it is obvious that the position of this point, such as it has just been constructed, corresponds to the neutral position of shoe 102. It is therefore necessary to determine this neutral position. For that purpose, it will be noted that according to Hooke's law the maximum point of pressure of the lining of the shoe 102 is that the radial displacement of which is greater for a given angle of rotation of the shoe; consequently, said point will be on the perpendicular 106 dropped to the centre 107 of the drum on the radius 108 passing through the axis 103. This perpendicular 106 will also be the pressure axis, relatively to which the lining of the shoe 102 will be symmetrically arranged, according to an angular opening determined by the usual considerations of the art, and which form no part of the invention. The shoe initially assumed to be in contact with the drum 109, is caused to rotate through the angle α.

Said angle is so chosen, relatively to the angle ω, that the centre of the friction surface of the shoe 102 moves away from the centre 107 of the drum 109, in neutral position to a distance approximately equal to that according to which the centre moves away from the friction surface of the shoe 101. In neutral position, the centre of the friction surface of the shoe 102 comes to 110, whereas the centre of the friction surface of the shoe 101 comes to 111; and the distances 107—110 and 107—111 are approximately equal.

After its rotation α towards its neutral position, the shoe 102 has come to 102', and it is to this position 102' that the point 105 previously found corresponds. Said point, in the working position of the shoe 102, comes to 105ᵃ, after a rotation through an angle α about 103.

If it was assumed that the shoe 101 was rigidly connected to the shoe 102, it would have rotated with the latter through an angle α. The point 112, for instance, will have come to 112' and the point 113 to 113'. Then, effecting about 105 a rotation β=ω—α, the shoe 101 would come to 101'; the point 112' would then be at 112'', and the point 113' at 113''. It is obvious that this double rotation of the shoe 101, first of α about 103, then of β about 105, gives exactly the same result as a rotation of ω about 104.

Of course, other initial elements can be chosen for determining the triangle O—O₁—O₂ of Fig. 19; more particularly the position of the point O₂ can be fixed on the axis of the brake, that is to say, on the diameter at right angles to the line of action of the device for spacing the shoes. In this case, the brake can be devised in a practically symmetrical manner, and its operation will be identical both for forward running and for reverse.

Figure 21:
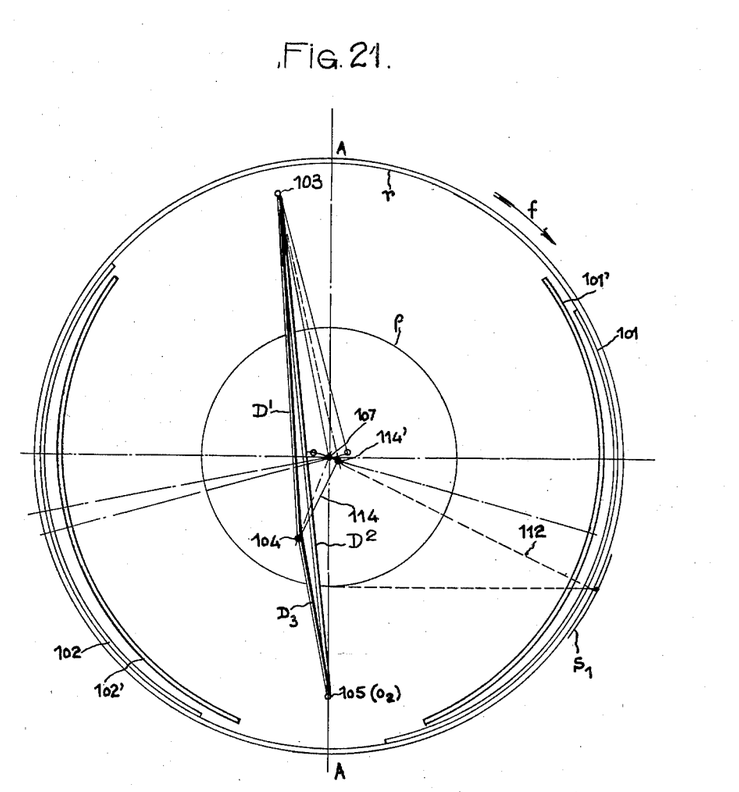
Fig. 21 is another diagram for determining the centres of the component rotations.

The theoretical tracing of such a brake has been effected in Fig. 21, in which the point O₂ is placed on the axis of the brake, it being admitted that in said brake the stresses which are exerted on the shoe 101, which is to be guided according to the invention, are directed at right angles to said axis.

In this case, the reaction exerted by the drum of the shoe is, of course, parallel to the other forces, and consequently, at right angles to the axis A—A of the brake; and it is known from the prior art, now well known, that this reaction is tangent to a circle having for centre the centre of the drum and the radius ρ of which is given by the formula: $\rho = S_1 \sin \varphi_1$ in which $\varphi_1$ is the friction angle and $S_1$ the radius of the pressure circle, itself given by the formula:

$$\frac{S_1}{r} = \frac{4 \sin \gamma_1}{\sin 2\gamma_1 + 2\gamma_1}$$

in which $r$ designates the radius of the drum and $2\gamma_1$ the angular opening of the lining carried by the shoe, which is given beforehand.

In this example of Fig. 21, the point 105 (corresponding to O₂) has been arranged on the axis A—A in a position fixed beforehand, and the position of the point 104 has also been chosen beforehand on the straight line 114 at right angles to the straight line 112 which is the direction of the pressure axis of the shoe 101. The distance 107—114' is equal, as explained above, to the component half-translation which is to be imparted to the shoe 101. The side D₃ is therefore traced. The angle ω of rotation of the shoe 101 about 104 being determined and equal to twice the angle 107—104—114', the direction of the side D₁ can be traced; and on this side, the point 103 is so chosen that the angle $$\frac{\alpha}{2}$$

formed between the sides D₁ and D₂ corresponds to the desirable value in order that the shoes 101 and 102 should be symmetrically arranged in the neutral position.

It will be seen that in such a brake the operation during reverse running (the direction of forward running being indicated by the arrow f) remains practically the same as for forward running.

In all cases, once the point 105 of shoe 102 about which shoe 101 must be rotatively guided, and all the elements of the various component and resultant rotations are determined, the technical problem remaining to be solved consists in ensuring the rotational guiding of the shoe 101 about the axis 105 of shoe 102 (axis which can be real or virtual) by means which are not inconsistent with the connections causing both shoes to cooperate during braking, and which include a link connected to both these shoes.

Figure 22:
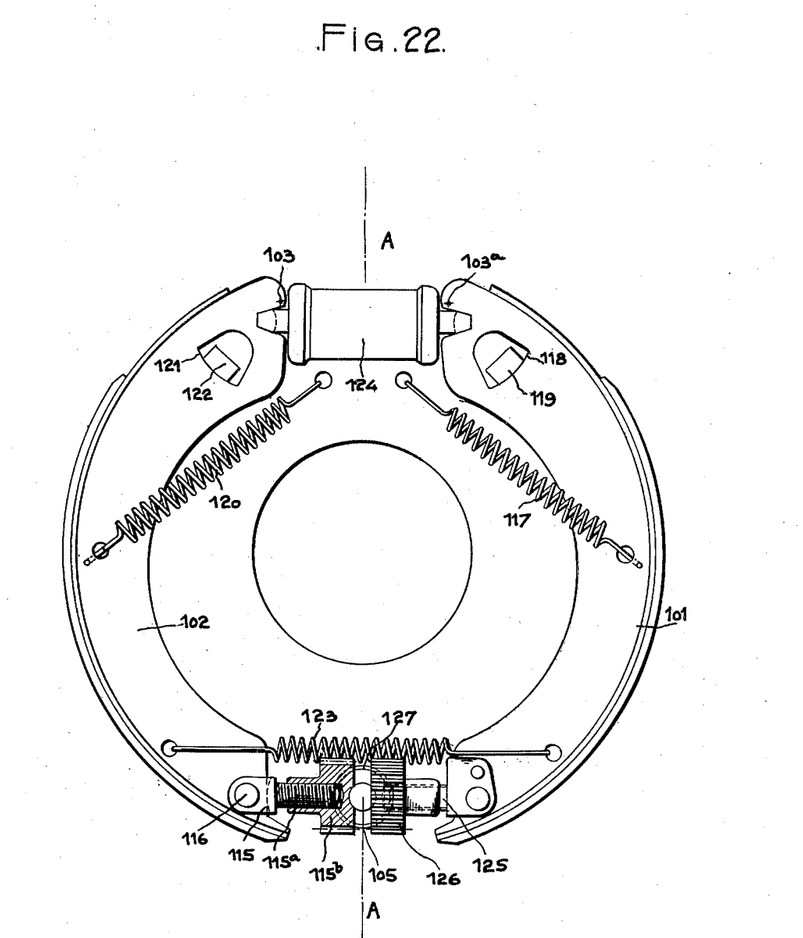
Fig. 22 shows a fourth embodiment of the invention.

In the example of Fig. 22, which corresponds to the diagram of Fig. 21 in which the axis 105 is, in neutral position, located on the symmetry axis of the brake, the solution of the above mentioned problem consists in causing the pivotal point of the link on one of the shoes to coincide with 105, and to obtain with sufficient friction the pivoting of the same link on the other shoe. Of course, the same solution can be adopted in other cases, in which the axis 105 would not be located on the symmetry axis of the brake. In this example, the shoes 101 and 102 are illustrated as being connected to each other by a link 115 freely pivoted at 105 on shoe 101 and frictionally pivoted at 116 on shoe 102. Consequently, except during the braking periods when the friction at 116 is practically negligible, both shoes 101 and 102 can be considered as being pivoted to each other at 105. In neutral position, the shoe 101 is pressed, under the action of a spring 117, by a circular surface 118 having its centre at 103ª, on a fixed bearing 119 having the same centre 103ª, and likewise, in neutral position, the shoe 102 is pressed, under the action of a spring 120, by a circular surface 121 having its centre at 103, on a fixed bearing 122 having the same centre 103.

A spring 123 cooperates with the springs 117 and 120. The usual spacing device is illustrated at 124; as usual, it exerts upon braking, a thrust on the inlet shoe, and forms abutment for the outlet shoe, at the same time as the bearing 119 or 122, according to the direction of rotation.

For allowing the play to be taken up, the link 115 is formed in two parts which screw one in the other; the part 115ª is the screw and the part 115ᵇ the nut. For the sake of symmetry, the shoe 101 terminates in a screw 125 on which is screwed the nut 126, and the pivotal joint 105 is obtained between the two nuts 115ᵇ and 126. These two nuts are peripherally toothed so as to mesh with a common wheel 127 which ensures their adjustment, the screws 115ª and 125 having obviously equal pitches, but of reverse direction. The pivotal joint, of course, is floating, that is to say it is not mounted on a fixed part.

Figure 23:
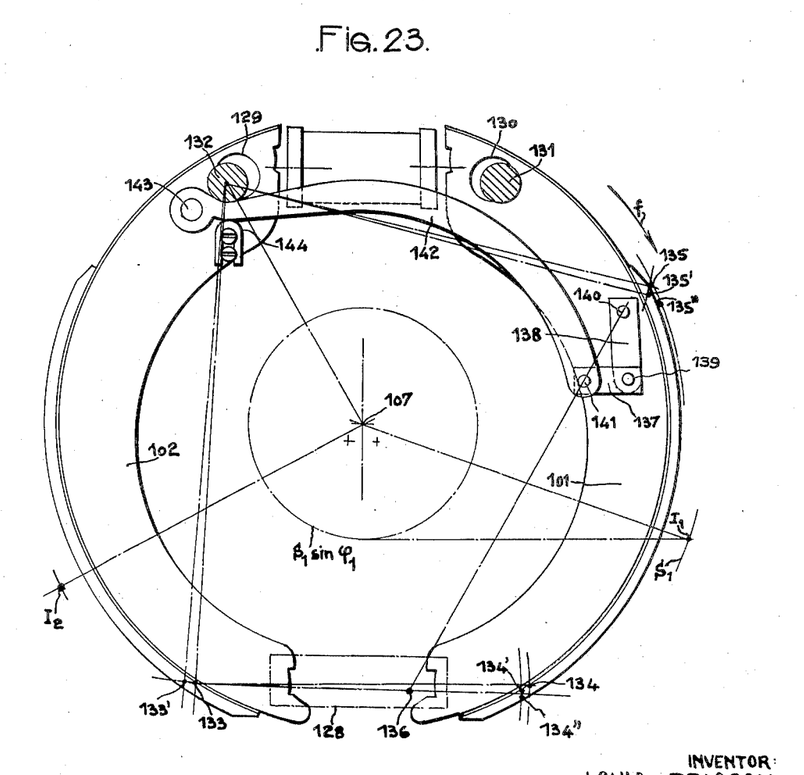
Fig. 23 shows a fifth embodiment of the invention.

In the example of Fig. 23, a brake has been shown of known type composed of two shoes 101 and 102 connected together by a link 128. These shoes are, at their free end, provided with openings 129—130 which respectively fit over two axes 131—132 forming fixed abutments, a spring (not shown) always maintaining the shoes in contact with these abutments.

The direction of rotation when running forward is assumed to be in the direction of the arrow $f$. It is known that the maximum displacements take place on the pressure axes according to a distance equal to the play in addition to the resiliency.

The pressure axis of the floating shoe 101, is determined as follows:
1. Trace the circle having a radius $S_1 \sin \varphi_1$
2. Trace a tangent to the circle $S_1 \sin \varphi_1$ which passes through the pole (for the case in question, the pole is infinity; said tangent is therefore parallel to the link 128)
3. The intersection of said tangent with the circle having a radius $S_1$ will give the centre of pressure $I_1$, and consequently, the pressure axis will be the straight line which connects 107 to $I_1$.

For determining the pressure axis of the shoe 102, it will be noted that in accordance with Hooke's law (the maximum pressure taking place at the point where the displacement is maximum), the centre of pressure $I_2$ will be on a straight line at right angles to the straight line 107—132, this perpendicular line will be at the same time the pressure axis.

It will first of all be assumed that the whole arrangement of the shoes will be caused to effect a rotation about the axis 132 so that the shoe 102 comes in contact with the drum.

The pivotal point 133 of the link 128 will come to 133′, the point 134 to 134′, and the point 135 to 135′. The point 133′ can then be considered as being fixed. By now moving the shoe 101 to bring it in its turn in contact with the drum, the point 134′ will come to 134″
the point 135′ will come to 135″ by noting that the distance 134′—135′ is the same as 134″—135″. Therefore, the intersection of the perpendicular dropped to the middle 134′—134″ and of the perpendicular dropped to the middle of 135′—135″ will give the mean instantaneous centre of rotation 136 sought for, for the shoe 101.

Upon opening the shoes, the shoe 101 moves away from the axis 131. Two rotations can then take place, simultaneously or not; the first about the axis 132, considered as fixed point, the second about the point 136.

The rotation about the point 131 gives rise to no difficulty; but for allowing the rotation about the point 136, this point 136 can either be materialized and connected by a link to the shoe 101, or it can be rendered virtual by means of two links 137 and 138 frictionally pivoted at 139, and provided that the straight line 140—141 passes through the point 136.

It is to be noted that once the shoe is in the position of rest, the unit forms a system having complete connections and consequently no displacement of the shoes is possible; they therefore remain centered in the middle of the drum.

The friction pivotal joint 139 ensures the automatic adjustment of the length of the link 140—141 at the first pull of the brakes.

For allowing braking in reverse drive, the pivotal joint 141 is mounted on a lever 142 pivoted at 143 on the shoe 102, but retained, in neutral position of said shoe, between the axis 132 and an abutment 144 of the shoe 102. When braking during reverse running, the shoe 102 disengages from its axis 132; the lever 142 can then rock about its axis 143; the system becomes floating, and the segments or shoes place themselves in the drums as if the centering system no longer existed. It is obvious that, in neutral position, the lever 142 again becomes fixed, and that the brake is again centered.

It will be noted that, in practice, the angles $\alpha$ and $\beta$ are very small; consequently, the points 0, $0_1$ and $0_2$ can be considered as being in a straight line, since the angle 0 of the triangle $0—0_1—0_2$ is practically a flat angle (180°). The invention includes of course, in its scope all the embodiments in which the floating shoe or shoes (for the direction of movement considered) are rotatively guided by means which have been described (rotation of a shoe about a fixed point, and of the floating shoe about a point of the preceding one) about an axis which approximately coincides with the centre of rotation theroetically determined for said floating shoe.

Figure 24:
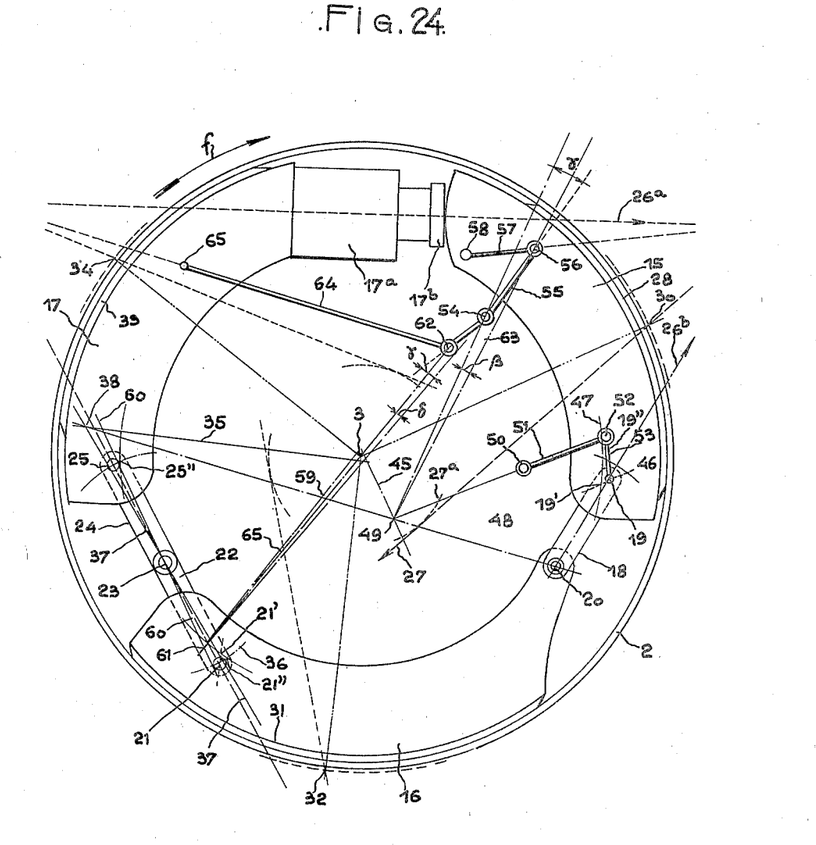
Fig. 24 shows a sixth embodiment of the invention.

Another improvement (Fig. 24) consists in the fact that, in the brake according to Fig. 15, the pivotal axis 20 of the link 18 could be arranged in such a manner that the straight line 38—20 passes through the point 49 (or in the vicinity of this point). In this case, the links 43 and 42 could be done away with, by adding friction to the pivotal joint 19, by rendering the pivotal joint 52 free, and by locating the pivot 50 on the straight line 49—52.

Finally, it is noted that if the arrangements described are those which give the best results, they can however be appreciably departed from without leaving the scope of the invention, whilst obtaining results still superior to those given by known devices. Theoretically, as explained, the centres of resultant rotation are chosen on a perpendicular to the pressure axis, drawn at a distance from the centre equal to the half-translation to be imparted to the shoe; this distance being small the angle formed by the pressure axis and the straight line which joins the center of the resultant rotation and the centre of the drum is very near 90°. This angle is equal to $90° \pm \epsilon$, the quantity $\epsilon$ being small. Practice shows that still better results are obtained than those of the devices priorly known, if the quantity $\epsilon$ is no longer very small; the value $$\frac{2700}{2\gamma}$$

can even be reached, $2\gamma$ being the angular opening of the shoe considered counted in degrees. Therefore, the invention would not be departed from by constructing a brake of the type indicated in which the angle formed by the pressure axis of the shoe and the straight line joining the centre of resultant rotation of said shoe and the centre of the drum would be comprised between $$\left(90° + \frac{2700}{2\gamma}\right)$$

and $$\left(90° - \frac{2700}{2\gamma}\right)$$

What I claim as my invention and desire to secure by Letters Patent is:

1. In a brake, a drum, a shoe having a working position in which it is in contact with the drum according to an arc of circle and a neutral position distant from said drum, in which the direction of the geometrical axis of symmetry of said arc passes in the vicinity of the geometrical centre of the drum, a bearing member, a link pivoted on said bearing member and on the shoe for exerting on the latter, in working position, a reaction of definite direction, a guiding pivot, a first arm pivoted on said pivot, a second arm pivoted on the shoe, and a friction joint connecting both arms so as to determine, in cooperation with the link, the path of the shoe between its two positions.

2. In a brake, a drum, a shoe having a working position in which it is in contact with the drum according to an arc of circle and a neutral position distant from said drum, in which the direction of the geometrical axis of symmetry of said arc passes in the vicinity of the geometrical centre of the drum, a bearing member, a link pivoted on said bearing member and on the shoe for exerting on the latter, in working position, a reaction of definite direction, a guiding pivot, a first arm pivoted on said pivot, a second arm pivoted on the first arm, and a friction joint connecting the second arm to the shoe so as to determine, in cooperation with the link, the path of the shoe between its two positions.

3. In a brake, a drum, a first shoe having a working position in which it is in contact with the drum according to an arc of circle and a neutral position distant from said drum, in which the direction of the geometrical axis of symmetry of said arc passes in the vicinity of the geometrical centre of the drum, a second shoe having a working position in which it is in contact with the drum and a neutral position distant from said drum, in which the direction of the geometrical axis of symmetry of said arc passes in the vicinity of the geometrical centre of the drum, a link pivoted on each of the shoes for transmitting from one to the other of these shoes in working position, a reaction of definite direction, a first pivot, a first arm pivoted on said pivot, a second arm pivoted on the preceding one, a friction joint for connecting the second arm to the second shoe, a second pivot, a third arm pivoted on said second pivot, a fourth arm pivoted on the shoe, and a friction joint for connecting the third and the fourth arms together.

4. In a brake, a drum, a first shoe having a working position in which it is in contact with the drum according to an arc of circle and a neutral position distant from said drum, in which the direction of the geometrical axis of symmetry of said arc passes in the vicinity of the geometrical centre of the drum, a bearing member, a link pivoted on said bearing member and on the shoe for exerting on the latter, in working position a reaction of definite direction, a second shoe having a working position in which it is in contact with the drum according to an arc of circle, and a neutral position distant from said drum, in which the direction of the geometrical axis of symmetry of said arc passes in the vicinity of the geometrical centre of the drum, a link pivoted on each of said shoes for transmitting from one of said shoes to the other, in working position a reaction of definite direction, a first pivot, a first arm pivoted on said pivot, a second arm pivoted on the preceding one, a friction joint for connecting the second arm to the second shoe, a second pivot, a third arm pivoted on said second pivot, a fourth arm pivoted on the shoe, and a friction joint for connecting the third and the fourth arms together.

5. In a brake, a drum, a first shoe having a working position in which it is in contact with the drum according to an arc of circle and a neutral position distant from said drum, in which the direction of the geometrical axis of symmetry of said arc passes in the vicinity of the geometrical centre of the drum, a bearing member, a link pivoted on said bearing member and on the shoe for exerting on the latter, in working position, a reaction of definite direction, a second shoe having a working position in which it is in contact with the drum according to an arc of circle, and a neutral position distant from said drum, in which the direction of the geometrical axis of symmetry of said arc passes in the vicinity of the geometrical centre of the drum, a link pivoted on each of said shoes for transmitting from one of said shoes to the other, in working position a reaction of definite direction, a first pivot, a lever having two branches pivoted on said pivot, an arm pivoted at the end of the first branch of the lever, a friction joint for connecting the arm to the second shoe, guiding means of limited reaction for another point of said second shoe, a third shoe, a link pivoted on the bearing member and on said third shoe, a second arm pivoted to the second end of the lever, and a friction joint for connecting the second arm to the third shoe.

6. In a brake, a drum, two shoes, a link for connecting two adjacent ends of said shoes, spacing means arranged between the other adjacent ends of said shoes, guiding means of limited reaction for one of the shoes, means, controlled by the other shoe, for putting out of action said guiding means when the drum is braked in a certain direction of rotation.

7. In a brake, a drum, two shoes, a link for connecting two adjacent ends of said shoes, spacing means arranged between the other adjacent ends of said shoes, a compass having two branches frictionally pivoted on each other, a pivotal joint for connecting one of the branches to the first shoe, a lever, a pivot for said lever, a pivotal joint for connecting the second branch of the compass to the lever, and means for holding the lever stationary, controlled by the second shoe, said means being so arranged as to release the lever when the second shoe is moved by the spacing device.

8. In a brake, a drum, two shoes, a link for connecting two adjacent ends of said shoes, spacing means arranged between the other adjacent ends of said shoes, a compass having two branches frictionally pivoted to each other, a pivotal joint for connecting one of the branches to the first shoe, a lever, a pivot for said lever arranged on the second shoe, a pivotal joint for connecting the second branch of the compass to the lever, and means controlled by the second shoe for preventing the pivotal movement of the lever, said means being so arranged as to release the lever when the second shoe is moved by the spacing device.

9. In a brake, a drum, a plurality of shoes, links for connecting the adjacent ends of said shoes, spacing means arranged between the adjacent ends of the first and of the last shoes, guiding means of limited reaction for each of the shoes, and means controlled by the last shoe for rendering said guiding means inoperative when the last shoe is moved by the spacing means.

10. In a brake, a drum, two shoes each respectively having a working position in which it is in contact with the drum according to an arc of circle and a neutral position distant from said drum, in which the direction of the geometrical axis of symmetry of said arc passes in the vicinity of the geometrical centre of the drum, a spacing device arranged between the adjacent ends of both shoes, a link arranged between the other adjacent ends of both shoes, a pivotal joint for connecting the link to the first shoe, a friction joint for connecting the link to the second shoe, the free pivotal joint being placed so that the geometrical line passing through its centre and through the centre of the drum is perpendicular to the direction of the forces exerted by the spacing device.

11. In a brake, a drum, two shoes each respectively having a working position in which it is in contact with the drum according to an arc of circle and a neutral position distant from said drum, in which the direction of the geometrical axis of symmetry of said arc passes in the vicinity of the geometrical centre of the drum, a link for connecting two adjacent ends of said shoes, spacing means arranged between the other adjacent ends of said shoes, a compass having two branches frictionally pivoted on each other, a pivotal joint for connecting one of the branches to the first shoe, a lever, a pivot for said lever, a pivotal joint for connecting the second branch of the compass to the lever, and means for holding the lever stationary, controlled by the second shoe, said means being so arranged as to release the lever when the second shoe is moved by the spacing device.

12. In a brake, a drum, two shoes each respectively having a working position in which it is in contact with the drum according to an arc of circle and a neutral position distant from said drum, in which the direction of the geometrical axis of symmetry of said arc passes in the vicinity of the geometrical centre of the drum, a link for connecting two adjacent ends of said shoes, spacing means arranged between the other adjacent ends of said shoes, a compass having two branches frictionally pivoted to each other, a pivotal joint for connecting one of the branches to the first shoe, a lever, a pivot for said lever arranged on the second shoe, a pivotal joint for connecting the second branch of the compass to the lever, and means controlled by the second shoe for preventing the pivotal movement of the lever, said means being so arranged as to release the lever when the second shoe is moved by the spacing device.

13. In a brake, a drum, two shoes each respectively having a working position in which it is in contact with the drum according to an arc of circle and a neutral position distant from said drum, in which the direction of the geometrical axis of symmetry of said arc passes in the vicinity of the geometrical centre of the drum, a link for connecting two adjacent ends of said shoes, spacing means arranged between the other adjacent ends of said shoes, guiding means of limited reaction for one of the shoes, means, controlled by the other shoe, for putting out of action said guiding means when the drum is braked in a certain direction of rotation.

LOUIS BRISSON.